(No Model.)
W. R. EXUM.
WAGON WHEEL HOLDING APPLIANCE.
No. 454,680. Patented June 23, 1891.
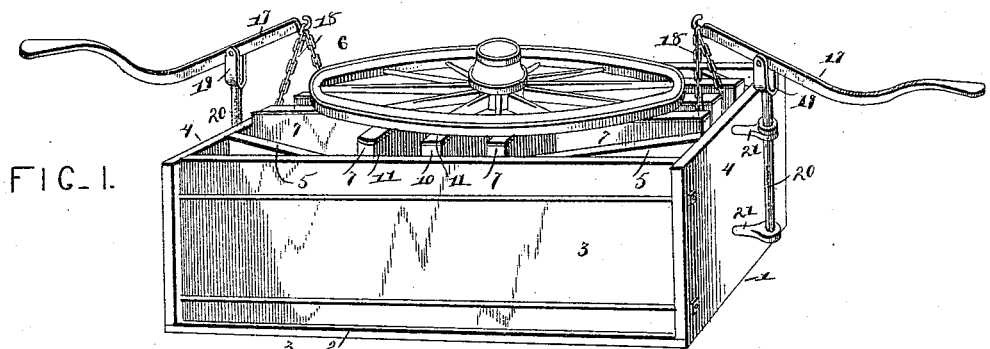
FIG. 1.
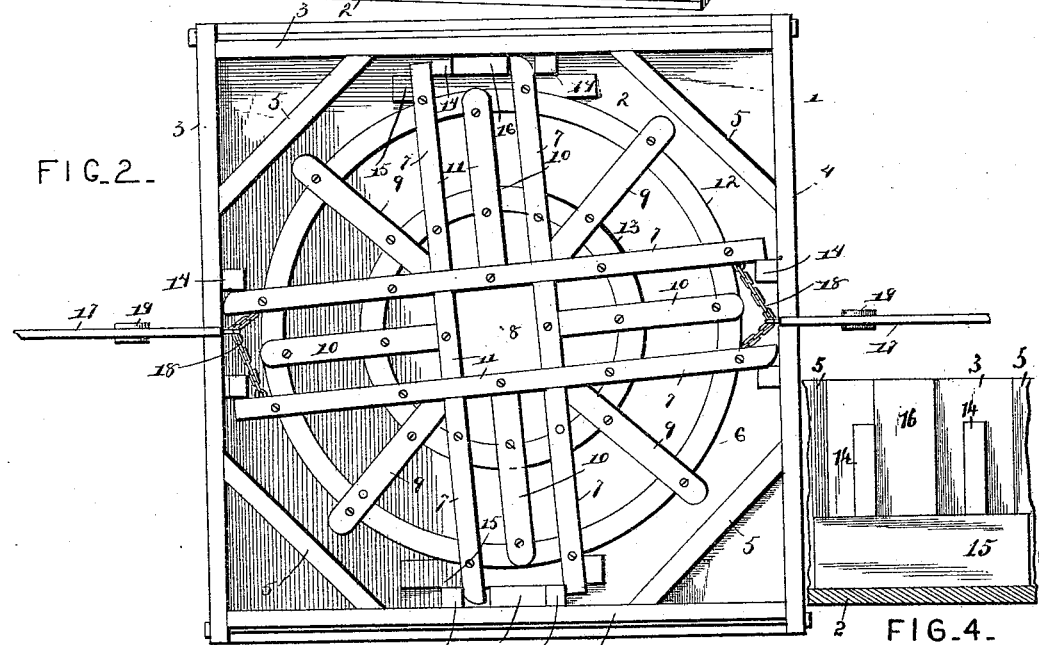
FIG. 2.
FIG. 4.
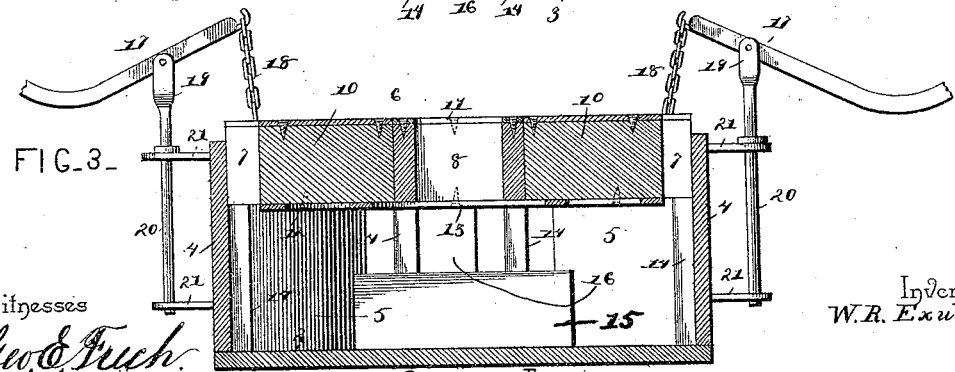
FIG. 3.
Witnesses
Geo. E. Fruch
H. F. Riley
Inventor
W. R. Exum
By his Attorneys,
C. A. Snow & Co.

UNITED STATES PATENT OFFICE.

WILLIAM R. EXUM, OF LITTLE ROCK, ARKANSAS.

WAGON-WHEEL-HOLDING APPLIANCE.

SPECIFICATION forming part of Letters Patent No. 454,680, dated June 23, 1891.

Application filed September 18, 1890. Serial No. 365,398. (No model.)

*To all whom it may concern:*

Be it known that I, WILLIAM R. EXUM, a citizen of the United States, residing at Little Rock, in the county of Pulaski and State of Arkansas, have invented a new and useful Wagon-Wheel-Holding Appliance, of which the following is a specification.

The invention relates to improvements in machines for facing and cooling vehicle-wheels.

The object of the present invention is to provide a device capable of holding various kinds of vehicle-wheels and of quickly immersing the same in a bath for the purpose of cooling a heated tire after the latter has been placed in proper position on a wheel and of quickly elevating the wheel from the bath after the tire has become sufficiently cool.

The invention consists in the construction and novel combination and arrangement of parts hereinafter fully described, illustrated in the accompanying drawings, and pointed out in the claims hereto appended.

In the drawings, Figure 1 is a perspective view of a wheel-holding machine constructed in accordance with this invention, a wheel being shown on the frame. Fig. 2 is a plan view showing the position of the wheel-frame when lowered. Fig. 3 is a vertical sectional view showing the frame supported preparatory to lowering a wheel within the bath-box. Fig. 4 is a detail view.

Referring to the accompanying drawings, 1 designates a square box composed of a bottom 2 and sides 3 and 4, which are braced and supported at their angles by partitions 5, which form, with the middle portion of the sides 3 and 4, an octagonal receptacle adapted to contain water for the purpose of cooling a heated tire after the latter has been properly placed on the felly of a wheel. The wheel is supported on an approximately octagonal frame 6, composed of bars 7, arranged in pairs and consisting of two pairs centrally crossing each other and forming a central rectangular hub-opening 8, and the said bars 7 at their point of crossing are mortised and lie in the same horizontal plane. Arranged between the ends of the bars 7 are short bars 9 and 10, the former of which are arranged in the angle formed by the bars 7, and the latter ones 10 are arranged between the parallel ends of the bars 7. The upper face of the frame 6 is covered by metal plates 11, which are secured to the upper faces of the bars of the frame by screws or the like, which pass through perforations of the plates, and the latter are adapted to prevent a heated tire burning the wood-work of the frame. The lower face of the frame has secured to it circular braces or rings 12 and 13, which are provided with perforations and are secured to the bars by screws or the like and retain the said bars in their proper position, and thereby hold the parts of the frame together. The ends of the bars 7 extend beyond the outer ring 12 and the short bars 10 and are adapted to engage vertical parallel guide-strips 14, which are arranged vertically on the inner faces of the sides 3 and 4 of the box, and they guide the frame 6 in its vertical movement, and the latter when lowered within the box rest upon horizontal supporting-strips 15, secured to the outer faces of the guide-strips of the sides 3. When the frame is in its elevated position, the ends of the bar are supported by the guide-strips upon which the frame rests, and the sides 3 have secured to them stop-bars 16, which are arranged adjacent to one guide-bar of each pair, and the said stop-bars extend above the tops of the guide-bars and form shoulders to prevent the frame 6 slipping from the guide-strips; but a slight movement of the frame on its axis in a direction opposite to the stop-bars brings the ends of the bars of the frame beyond the guide-strips, thereby causing the frame to fall in being guided in its down movement by the strips 14.

The frame is raised and lowered by levers 17, which have their inner ends connected with the frame by chains 18, and are fulcrumed at points intermediate of their ends in the upper bifurcated ends 19 of rods 20, which have cylindrical stems journaled in eyes 21, extending from the outer faces of the sides 4 of the frame, and the said rods are adapted to be turned in their bearings to slightly rotate the frame and move it from its support. A wheel is placed on the frame with its hub on the central rectangular opening 8. As soon as the tire has been properly placed on the wheel the frame is slightly turned by means of the journaled rods and the lever, and is thereby lowered, carrying the wheel and its heated tire into the water contained by the box, thereby cooling the tire.

It will be readily seen that the frame is adapted to receive any kind of a vehicle-wheel, and the machine is capable of lowering the frame and immersing the wheel in a bath of water as soon as a tire has been properly placed on a felly.

What I claim is—

1. The combination of the box, the guide-strips secured to the sides of the box, the stop-bars 16, projecting above the adjacent guide-strips, the horizontal supporting-strips 15, secured to the outer faces of the guide-strips, the frame having the central hub-opening, the rods 19, journaled at opposite sides of the frame, the levers fulcrumed at the upper ends of the rod, and the chains connecting the levers and the frame, substantially as described.

2. The combination of the rectangular box, the partitions 5, arranged at the angles of the sides and forming an octagonal receptacle, the guide-strips 14, arranged in pairs on the inner faces of the sides of the box, the stop-bars projecting above the guide-strips, the parallel plates extending from opposite sides of the box and provided with eyes, the rods 19, journaled in the eyes and having their upper ends bifurcated, the frame compressing the bars 7, and the lever fulcrumed in the bifurcations of the rods and connected with the frame by chains, substantially as described.

In testimony that I claim the foregoing as my own I have hereto affixed my signature in presence of two witnesses.

his
  WILLIAM × R. EXUM.
       mark

Witnesses:
 FRANK F. SMITH,
 JOHN M. ROSE.